(12) United States Patent
Xenopoulos et al.

(10) Patent No.: US 8,129,461 B2
(45) Date of Patent: Mar. 6, 2012

(54) SILICA-BASED COATING COMPOSITION AND ITS USE FOR COATING CEMENT-BONDED OBJECTS

(75) Inventors: Constantinos Xenopoulos, Lyons (FR); Vincent Teissier, La Tour du Pin (FR); Emmanuel Fourdin, Meyrie (FR)

(73) Assignee: Lafarge SA (FR)

( * ) Notice: Subject to any disclaimer, the term of this patent is extended or adjusted under 35 U.S.C. 154(b) by 1163 days.

(21) Appl. No.: 11/926,694

(22) Filed: Oct. 29, 2007

(65) Prior Publication Data

US 2008/0261024 A1 Oct. 23, 2008

(30) Foreign Application Priority Data

Nov. 7, 2006 (EP) .................................... 06291724

(51) Int. Cl.
| | |
|---|---|
| B29C 65/48 | (2006.01) |
| B32B 7/04 | (2006.01) |
| B32B 7/12 | (2006.01) |
| B32B 25/20 | (2006.01) |
| C09J 183/00 | (2006.01) |
| C08K 5/54 | (2006.01) |
| C08K 3/10 | (2006.01) |
| C08K 3/18 | (2006.01) |
| C08K 3/20 | (2006.01) |
| C08K 3/22 | (2006.01) |
| C08K 3/34 | (2006.01) |
| C08K 3/36 | (2006.01) |
| C08K 3/40 | (2006.01) |

(52) U.S. Cl. ...... 524/493; 156/60; 156/329; 252/183.13; 428/446; 428/447; 524/492; 524/588; 524/847; 524/858

(58) Field of Classification Search ............. 106/287.13, 106/287.34; 427/186, 421.1, 427, 427.4, 427/428.01, 429, 430.1; 428/331, 446, 447; 524/457, 492, 493, 588, 730, 847, 858; 156/60, 156/72, 329; 252/183.13
See application file for complete search history.

(56) References Cited

U.S. PATENT DOCUMENTS

| | | | | |
|---|---|---|---|---|
| 5,360,851 A | * | 11/1994 | Feder et al. | ............ 524/157 |
| 5,739,197 A | * | 4/1998 | Swift et al. | ............ 524/492 |
| 6,284,834 B1 | | 9/2001 | Kirchmeyer et al. | |
| 6,455,219 B1 | * | 9/2002 | Chen et al. | ......... 430/137.14 |
| 6,919,398 B1 | | 7/2005 | Born et al. | |
| 2002/0058758 A1 | | 5/2002 | Culbertson et al. | |

FOREIGN PATENT DOCUMENTS

EP 522 585 1/1993

OTHER PUBLICATIONS

Itatani, Kiyoshi, Ari Ooe, Ian J. Davies, Tomohiro Umeda, Yoshiro Musha and Seiichiro Koda. Effect of Colloidal Silica Addition on the Formation of Porous Spherical a-caclum orthophosphate agglomerates by spray pyrolysis techniques. (2009) Journal of the Ceramic Society of Japan, 117(3), 363-368. Online at: http://www.jstage.jst.go.jp/article/jcer.*

Suzuki, Takuya, Hitoshi Endo, and Mitsuhiro Sibayama. Analysis of Surface Structure and Hydrogen/Deuterium Exchange of Colloidal Silica Suspension by Contrast-Variation Small-Angle Neutron Scattering. (2008) Langmuir 24, 4537-3543. Online at: http://pubs.acs.org/doi/pdf/10.1021/la7039515.*

* cited by examiner

*Primary Examiner* — Milton I Cano
*Assistant Examiner* — Darcy D Laclair
(74) *Attorney, Agent, or Firm* — Lerner, David, Littenberg, Krumholz & Mentlik, LLP

(57) ABSTRACT

The invention relates to a composition comprising a binder, filler particles and water, wherein the binder comprises amorphous silica and a vinyl-functional silicone polymer. The invention also relates to a method of making this composition as well as to a method of coating a substrate comprising applying the composition onto the substrate.

17 Claims, No Drawings

US 8,129,461 B2

SILICA-BASED COATING COMPOSITION AND ITS USE FOR COATING CEMENT-BONDED OBJECTS

CROSS-REFERENCE TO RELATED APPLICATIONS

This application claims priority to European Patent Application No. 06291724.0 filed on Nov. 7, 2006, the entire contents of which are hereby incorporated by reference herein.

TECHNICAL FIELD

The present invention relates to a silica-based coating composition, to a process for making same, as well as to the use of the silica-based coating composition for coating objects, in particular cement-bonded objects.

TECHNICAL BACKGROUND

Cement bonded articles are coated on their surface in order to avoid efflorescence and to attain an aesthetic appearance. In the course of time the coating is exposed to weathering through atmospheric conditions. While with strong sun exposure in the summer the temperature on the surface may increase up to about 80° C., with frost the temperature can decrease to −30° C. in winter. The attack by cycles of freezing and thawing, as well as by acid rain, is particularly critical.

Various coating compositions are known in the art as useful for protecting cement bonded articles from weathering. Among these, silica-based coating compositions may in particular be cited.

U.S. Pat. No. 2,956,958 discloses a silica dispersion useful for coating a substrate such as glass. This dispersion contains amorphous silica particles in the proportion by weight of (a) one part of particles having a diameter larger than 50 nm and an average diameter D from 50 to 150 nm; (b) from 0 to 0.07 part of particles from 0.25 D to 0.4 D nm in diameter; and (c) from 0.04 to (0.4-x) part of particles 4 to 0.25 D nm in diameter where x is the parts by weight of portion (b). The dispersion does not contain any polymer.

U.S. Pat. No. 3,895,956 discloses a water permeability reducing inorganic coating slurry composition useful for coating construction surfaces. The composition contains 5-700 parts by weight of an inorganic filler; 0.1-30 parts by weight of a water swellable magnesium silicate and/or bentonite; 0.1-50 parts by weight of a water-repellent (alkali alkyl siliconate, inorganic powder coated with alkali alkyl siliconate or fatty acid); 0.01-10 parts by weight of a viscosity improver (monovalent alkali metal, ammonium or amine salt of a polyacrylic acid having a degree of polymerization of at least 2000, polyethyleneoxide of 500,000 molecular weight, or water soluble cellulose derivative); and 100 parts by weight of a silica sol containing a silica component ranging from 3-50 wt % and at least one alkali component, wherein the mole ratio of $SiO_2$ to $M_2O$ is greater than 4 ($M_2O$ being an alkali metal oxide, ammonium hemihydrate, an amine hemihydrate, guanidine hemihydrate or hydrazine hemihydrate).

U.S. Pat. No. 4,002,590 discloses a coating composition useful for coating construction surfaces. The composition comprises a coating liquid containing water, aqueous silica sol, an aqueous dispersion of butyl acrylate-methyl acrylate-styrene copolymer and an aggregate, wherein said coating liquid contains from 5 to 40 wt % as $SiO_2$ of colloidal silica, 3 to 40 wt % of said copolymer, a $SiO_2/M_2O$ mole ratio, wherein M is an alkali metal atom selected from the group consisting of Na, K, and Li, of from 7 to 2000 and has a viscosity lower than 100 c.p. at 20° C. when kept in a sealed state at 50° C. for 10 days.

U.S. Pat. No. 4,117,197 discloses a process for producing coated building components. The process comprises mixing an inorganic binder, water and aggregate to produce a workable mass, molding said mass into a preformed component, applying to the preformed component an aqueous paste containing a metal oxide and at least one of water-glass and a phosphate to form a coating and allowing the coating to harden. More precisely, about 190 to 400 g of the paste is applied per square meter of surface to be coated prior to hardening of such surface, the application being effected in the presence of at least about 0.5% by weight of the inorganic binder or, in the case of lime-sand bricks, by weight of the binder plus aggregate, of a water soluble inorganic salt which converts the aqueous paste into a gel-like non-flowing form, the inorganic salt being included in the foundation or protective layer. Preferred aqueous pastes comprise 42 to 63 mole % $SiO_2$, 11 to 27 mole % alkali oxide and 19 to 42 mole % metal oxide. The metal oxide may be ZnO, MgO, PbO, CaO, $B_2O_3$ and/or $Al_2O_3$.

U.S. Pat. No. 4,153,591 discloses a coating composition useful for coating construction surfaces. The composition is prepared by adding an aggregate to a coating liquid containing 5 to 40 wt % as $SiO_2$ of a colloidal silica and 3 to 40 wt % of dissolved and/or finely dispersed organic polymer, having an $SiO_2/M_2O$ mole ratio (in which M is a monovalent alkali metal atom) of at least 7, and having a viscosity lower than 100 c.p. at 20° C. when kept in the sealed state at 50° C. for 10 days. The organic polymer may in particular be chosen from the group consisting of polyvinyl acetate, poly(methyl acrylate), poly(butyl acrylate), styrene-butyl acrylate copolymers, vinyl acetate-maleic acid copolymers, urea-formalin resins, melamine-formalin resins, natural rubber, styrene-butadiene copolymer rubbers, acrylonitrile-butadiene, copolymer rubbers, epoxy resins and polyurethane resins.

EP 0247910 discloses a coating composition for coating almost any type of material. The composition contains (a) about 100 parts by weight (based on solids) of a binder component prepared by thermally dissolving about 10 to about 40 parts by weight of fine particles of silica in about 100 parts by weight (based on solids) of potassium silicate and (b) about 15 to about 100 parts by weight of pearl luster pigment. The composition is inorganic and does not comprise any polymer.

U.S. Pat. No. 5,330,794 discloses a silica-based coating useful for coating glass, metal, ceramic and plastic. The coating comprises a binder and a filler. The binder is a mixture of silica-based polymers, colloidal silica, and metal oxide particles in an aqueous suspension. It includes four main ingredients: an alkali metal silicate; silica gel; a crosslinking agent such as methyltrimethoxysilane or tetraethoxysilane; and water. Typical fillers include clay, wollastonite, nepheline syenite, talc, flint, ceramic fibers, metallic fibers, ceramic microspheres, glass microspheres, cerium dioxide and dichromium trioxide. The specified ratio of $SiO_2$ to alkali metal oxide is between 6.6:1 and 8.5:1.

U.S. Pat. No. 5,584,921 discloses coatings for building materials, in the form of an aqueous dispersion comprising: (a) 10 to 60 wt % of at least one polysiloxane; (b) 5 to 65 wt % of at least one colloidal silica in the form of silica sol; (c) 5 to 80 wt % of at least one pigment or unreactive filler; and (d) 0 to 30 wt % of at least one further varnish or paint additive, the sum of components (a), (b), (c) and (d) being 100 wt % on a water and solvent-free basis. As an example of polysiloxane is described an aqueous emulsion of a hydroxyl-functional methyl silicone resin of the average composition $T_{210}D_{23}M_4$ having an average molecular weight of approximately 12,000.

U.S. Pat. No. 5,824,147 discloses a silicate compound useful for coating building materials. The compound consists of silicon dioxide, alkali oxide selected from the group consisting of lithium oxide, potassium oxide, sodium oxide and mixtures thereof and one or more oxides selected from the group consisting of aluminum oxide, calcium oxide, titanium dioxide, magnesium oxide, zirconium dioxide and boric oxide, wherein the mol ratio of silicon dioxide to alkali oxide is 4-25:1, the mol ratio of aluminum oxide to silicon dioxide is 0-0.8:1, the mol ratio of calcium oxide to silicon dioxide is 0-0.45:1, the mol ratio of titanium dioxide to silicon dioxide is 0-0.45:1, the mol ratio of magnesium oxide to silicon dioxide is 0-0.45:1, the mol ratio of zirconium dioxide to silicon dioxide is 0-0.45:1 and the mol ratio of boric oxide to silicon dioxide is 0-0.45:1, and wherein said composition hardens at a temperature less than 100° C. This compound does not contain any polymer.

CA 2373132 discloses a silicate composition which comprises at least one amorphous binder matrix containing alkali oxide and silicon dioxide. The alkali oxide is lithium, sodium and/or potassium oxide. The amorphous binder comprises for each mole of alkali oxide more than 25 moles of silicon dioxide. The amorphous binder matrix comprises in addition for every 1000 g silicon dioxide in uniform distribution 10 g to 150 g of an integrated silicon-containing hydrophobing additive and the silicate composition comprises for every 1000 g silicon dioxide 400 to 7000 g of a filler substance whose particles have a thickness of less than 200 μm. The hydrophobing additive is preferably a polysiloxane, especially with alkoxy- and/or hydroxyl-functional groups.

However, the above coating compositions do not enable to achieve completely satisfactory results. In particular adhesion of the coating to the substrate is still insufficient for some applications. The resistance to weathering by freeze thaw attack due to water penetration as measured by contact angle is also inadequate to protect cement bonded articles for the long term.

There is thus a need for a new coating composition able to protect cement bonded surfaces and the like against weathering, said composition having better adhesive properties with superior self cleaning properties.

SUMMARY OF THE INVENTION

It is a first object of the invention to provide a composition comprising a binder, filler particles and water, wherein the binder comprises amorphous silica and a vinyl-functional silicone polymer.

According to a particular embodiment, the binder additionally comprises a crosslinker, preferably a reactive organofunctional siloxane or polysiloxane and a catalyst, preferably an organo-platinum complex.

According to a particular embodiment, the binder additionally comprises one or more alkali silicates, preferably potassium silicate.

According to a particular embodiment, the amorphous silica comprises colloidal silica particles.

According to a particular embodiment, the colloidal silica particles comprise a first group of particles having a size of more than 20 nm and a second group of particles having a size of less than 20 nm, as determined by laser particle size analysis, and wherein the second group contains 10 to 50 wt %, preferably 20 to 40 wt %, most preferably 30 to 35 wt % of all colloidal silica particles.

According to a particular embodiment:
the colloidal silica particles of the first group have a D50 in the range of 30 to 200 nm, preferably 60 to 120 nm, more preferably 80 to 90 nm and the colloidal silica particles of the second group have a D50 in the range of 3 to 20 nm, preferably 5 to 15 nm, more preferably 10 to 14 nm; and/or
the colloidal silica particles of the first group have a BET specific surface area in the range of 30 to 100 m²/g, preferably 40 to 70 m²/g, more preferably 45 to 55 m²/g and the colloidal silica particles of the second group have a BET specific surface area in the range of 200 to 600 m²/g, preferably 250 to 500 m²/g, more preferably 280 to 350 m²/g.

According to a particular embodiment, the amorphous silica comprises precipitated silica.

According to a particular embodiment, the precipitated silica is in the form of precipitated silica particles having
a BET specific surface area in the range of 75 to 500 m²/g, preferably 120 to 300 m²/g, more preferably 150 to 200 m²/g; and/or
a D50 in the range of 1 to 50 μm, preferably 4 to 25 μm, more preferably 6 to 12 μm.

According to a particular embodiment, the filler particles are selected from the group consisting of glass powder particles, zirconia particles, titania particles, alumina particles, crystalline silica particles and mixtures thereof.

According to a particular embodiment, the filler particles have
a BET specific surface area in the range of 0.1 to 5 m²/g, preferably 0.4 to 2 m²/g, more preferably 0.8 to 1 m²/g; and/or
a D50 in the range of 1 to 100 μm, preferably 8 to 50 μm, more preferably 12 to 20 μm.

According to a particular embodiment, the composition comprises one or more additives selected from the group consisting of thickeners, dispersing agents, defoaming agents, and mixtures thereof.

According to a particular embodiment:
the filler particles-to-amorphous silica weight ratio is in the range of 0.8 to 10, preferably 1.4 to 5; and/or
the silicone polymer weight content, expressed relative to the weight of the composition, is in the range of 0.5 to 15%, preferably 1.2 to 8%; and/or
the amorphous silica weight content, expressed relative to the weight of the composition, is in the range of 10 to 50%, preferably 15 to 40%.

It is another object of the present invention to provide a method for making a composition, comprising mixing together amorphous silica, a vinyl-functional silicone polymer, filler particles and optionally water.

According to a particular embodiment, said method comprises mixing:
a vinyl-functional silicone polymer emulsion;
a crosslinker and catalyst emulsion;
a first colloidal silica dispersion;
optionally, a second colloidal silica dispersion;
optionally, precipitated silica;
optionally, one or more alkali silicates, preferably potassium silicate;
filler particles;
optionally a dispersing agent and/or other additives; and
optionally additional water.

According to a particular embodiment:
the first colloidal silica dispersion consists of particles in an aqueous dispersion having a D50 in the range of 30 to 200 nm, preferably 60 to 120 nm, more preferably 80 to 90 nm and the second colloidal silica dispersion consists of particles in an aqueous dispersion having a D50 in the range of 3 to 20 nm, preferably 5 to 15 nm, more preferably 10 to 14 nm; and/or the first colloidal silica dispersion consists of particles in an aqueous dispersion having a BET specific surface area in the range of 30 to 100 m$^2$/g, preferably 40 to 70 m$^2$/g, more preferably 45 to 55 m$^2$/g and the second colloidal silica dispersion consists of particles in an aqueous dispersion having a BET specific surface area in the range of 200 to 600 m$^2$/g, preferably 250 to 500 m$^2$/g, more preferably 280 to 350 m$^2$/g.

According to a particular embodiment, said method comprises mixing:

5 to 25 parts of the vinyl-functional silicone polymer emulsion, wherein the vinyl-functional silicone polymer emulsion contains 30 to 50 wt % of dry silicone polymer;
1 to 5 parts of the crosslinker and catalyst emulsion;
40 to 70 parts of the first colloidal silica dispersion, wherein the first colloidal silica dispersion contains 20 to 60 wt % silica;
0 to 60 parts of the second colloidal solution, wherein the second colloidal silica dispersion contains 10 to 40 wt % silica;
0 to 25 parts of the precipitated silica;
1 to 25 parts of the potassium silicate;
0 to 15 parts of additional water;
per 100 parts of the filler particles.

According to a particular embodiment, the order of addition during mixing is the following:

a) a first portion of the first and/or second colloidal silica dispersion;
b) the dispersing agent, when present;
c) the precipitated silica, when present;
d) the filler particles;
e) the remaining portion of the first and/or second colloidal silica dispersion;
f) the alkali silicate, when present;
g) optionally additional water;
h) the vinyl-functional silicone polymer emulsion; and
i) the crosslinker and catalyst emulsion.

According to a particular embodiment of the abovementioned method, the composition is as described above.

It is another object of the invention to provide a method of coating a substrate comprising applying the composition of the invention onto the substrate.

According to a particular embodiment, the substrate is the surface of a cement bonded article, preferably a roofing tile.

According to a particular embodiment, the composition is applied in a thickness in the range of 60 µm to 2 mm, preferably 80 µm to 200 µm, more preferably 100 µm to 150 µm.

According to a particular embodiment, the composition is applied by brushing, rolling, pouring, immersing or preferably by spraying.

It is another object of the invention to provide a cement bonded article coated by the composition of the invention, optionally crosslinked.

According to a particular embodiment, said cement bonded article is a roofing tile.

It is another object of the invention to provide the use of the composition of the invention for protecting the surface of a cement bonded substrate against weathering.

The present invention enables one to overcome the inconveniences of the prior art. In particular the invention provides a composition or paint useful for producing a protective coating on cement bonded articles and the like, said coating exhibiting weathering resistance by exhibiting better adhesion and higher water contact angle relative to prior art products.

This is obtained by providing in the same composition a vinyl-functional silicone polymer and amorphous silica, the polymer being able to effectively undergo crosslinking. The silicone crosslink provides better weather durability and a durable hydrophobing effect. The effect of the silicone crosslinking is seen in the ability of the coating to maintain a high contact angle even after weathering conditions. Contact angles conducive to self cleaning have been shown to be maintained even after weathering with the present invention.

DESCRIPTION OF EMBODIMENTS

The invention will now be described in more detail without limitation in the following description.

Composition

The composition according to the invention contains a binder, filler particles and water.

The binder comprises amorphous silica and a vinyl-functional silicone polymer.

The vinyl-functional silicone polymer is a polysiloxane polymer which may be linear or branched. The polysiloxane polymer comprises siloxane (or silica) units of the M, D, T or Q type (respectively monofunctional, difunctional, trifunctional and quadrifunctional). Reference is made to Walter Noll "Chemie und Technologie der Silicone", Verlag Chemie, Weinheim, 1968, p. 3.

By M type is meant a siloxane unit of the following formula:

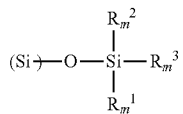

By D type is meant a siloxane unit of the following formula:

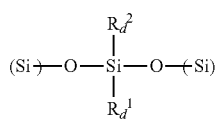

By T type is meant a siloxane unit of the following formula:

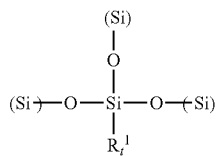

By Q type is meant a silica unit of the following formula:

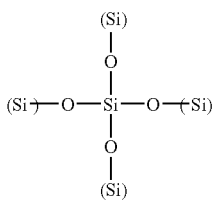

A silicone polymer with exclusively M and D units is a linear polysiloxane. A silicone polymer with some T and/or Q units is a branched polysiloxane. Preferably, the vinyl-functional silicone polymer used herein is a branched polysiloxane having more than 50% D units.

For the silicone polymer used in the context of the present invention, each of the $R_m^1$, $R_m^2$, $R_m^3$, $R_d^1$, $R_d^2$ and $R_t^1$ groups in the above formulae may be chosen among hydrogen, alkyl, halogen, alkoxy, acyloxy, ketoximate, amino, amido, acid amido, aminoxy, mercapto and alkenyloxy. Preferred groups are alkyl, alkoxy, amino and epoxy.

Besides, by "vinyl-functional" is meant that at least some of the $R_m^1$, $R_m^2$, $R_m^3$, $R_d^1$, $R_d^2$ and/or $R_t^1$ groups in the silicone polymer presently used are of the vinyl type or of a similar type leading to substantially the same type of reaction. This includes in particular vinyl, acrylic, methacrylic, epoxy, vinyl ester groups. Most preferably, "vinyl-functional" means that some of the $R_m^1$, $R_m^2$, $R_m^3$, $R_d^1$, $R_d^2$ and/or $R_t^1$ groups are vinyl groups (Si—C=C).

The vinyl-functional silicone polymer used herein is preferably able to crosslink. A preferred example of vinyl-functional silicone polymer is the polymer made in emulsified form by Dow Corning under the trade name Syl-Off® 7900.

The molecular weight of the polymer may for example vary from 2,000 to 20,000, preferably from 8,000 to 15,000. For example it can approximately be 11,000.

The composition according to the invention preferably contains a crosslinker. Without limiting the invention this crosslinker may be a siloxane or polysiloxane as described above in relation with the vinyl-functional silicone polymer, except that it is not necessarily vinyl-functional. The crosslinker may be an organo-functional siloxane or polysiloxane and is more preferably more reactive than the above-mentioned vinyl-functional silicone polymer (for example it may contain a higher frequency of functional groups).

A preferred example of crosslinker is the crosslinker contained in the emulsion made by Dow Corning under the trade name Syl-Off® 7922.

The composition according to the invention preferably contains a catalyst. The catalyst is preferably an organo-platinum complex.

A preferred example of catalyst is the catalyst contained in the emulsion made by Dow Corning under the trade name Syl-Off® 7922.

The main component of the binder is amorphous silica. Amorphous silica may include colloidal silica and/or precipitated silica, preferably a mixture of both.

By colloidal silica is meant silica particles at least one dimension of which is less than 1 µm and more than 1 nm, dispersed in the water of the composition.

By precipitated silica is meant limited aggregates with a loose structure made of primary particles, said primary particles having at least one dimension greater than 5 nm. Precipitated silica may be produced by a chemical reaction in an aqueous solution from alkali silicate with a mineral acid optionally followed by size reduction by milling or the like.

According to a preferred embodiment, the precipitated silica is in the form of aggregated particles having a BET specific surface area in the range of 75 to 500 m$^2$/g, preferably 120 to 300 m$^2$/g, more preferably 150 to 200 m$^2$/g, ideally of approximately 175 m$^2$/g. The aggregated particles preferably have a D50 in the range of 1 to 50 µm, preferably 4 to 25 µm, even more preferably 6 to 12 µm.

According to a preferred embodiment, the colloidal silica has a D50 from 3 to 200 nm, preferably from 5 to 100 nm. In the context of the present description, the D50 refers to the DV50 i.e. the 50$^{th}$ percentile of a given particle size distribution as determined by laser particle size analysis. Similarly, the D20 refers to the DV20 and the D90 refers to the DV90.

According to a preferred embodiment, the specific surface area of the colloidal silica as determined by the BET method (BET specific surface area) ranges from 30 to 600 m$^2$/g.

Colloidal silica of the Levasil® grades (by H. C. Starck) is a preferred choice.

The colloidal silica preferably comprises two groups of particles, the first group consisting in particles having a size of more than 20 nm and the second group consisting in particles having a size of less than 20 nm, the size referring to the x-position on a laser particle size analysis graph.

The D50 of the first group of particles preferably ranges from 30 nm to 200 nm, more preferably from 60 nm to 120 nm, most preferably from 80 nm to 90 nm and is ideally approximately 85 nm.

The D20 of the first group of particles preferably ranges from 20 nm to 150 nm, more preferably from 50 nm to 120 nm, most preferably from 80 nm to 90 nm and is ideally approximately 76 nm.

The D90 of the first group of particles preferably ranges from 40 nm to 200 nm, more preferably from 60 nm to 150 nm, most preferably from 90 nm to 120 nm and is ideally approximately 106 nm.

The D50 of the second group of particles preferably ranges from 3 nm to 20 nm, more preferably from 5 nm to 15 nm. According to a first variant, it is most preferably from 10 nm to 14 nm and is ideally approximately 12 nm. According to a second variant, it is most preferably from 5 to 10 nm and is ideally approximately 6 nm.

The D20 of the second group of particles preferably ranges from 3 nm to 20 nm, more preferably from 3 nm to 15 nm. According to a first variant, it is most preferably from 8 to 12 nm and is ideally approximately 10 nm. According to a second variant, it is most preferably from 3 to 5 nm and is ideally approximately 4 nm.

The D90 of the second group of particles preferably ranges from 3 nm to 20 nm, more preferably from 6 nm to 20 nm. According to a first variant, it is most preferably from 15 to 20 nm and is ideally approximately 17 nm. According to a second variant, it is most preferably from 8 to 12 nm and is ideally approximately 10 nm.

The size distribution of the first group of particles preferably exhibits at least one local maximum (peak) at a size of more than 20 nm. The size distribution of the second group of particles preferably exhibits at least one local maximum (peak) at a size of less than 20 nm. According to a particular embodiment, the global size distribution of the colloidal silica particles is bimodal, with one peak at less than 20 nm and another peak at more than 20 nm. However, configurations with multiple peaks are also possible.

A bimodal or multimodal distribution is advantageous in terms of particle packing. A better particle packing has a positive impact on cracking in a coating layer.

The BET specific surface area of the first group of particles preferably ranges from 30 m$^2$/g to 100 m$^2$/g, more preferably from 40 m$^2$/g to 70 m$^2$/g, most preferably from 45 m$^2$/g to 55 m$^2$/g and is ideally approximately 50 m$^2$/g.

The BET specific surface area of the second group of particles preferably ranges from 200 m$^2$/g to 600 m$^2$/g. According to a first variant, it is more preferably from 250 m$^2$/g to 500 m$^2$/g, most preferably from 280 m$^2$/g to 350 m$^2$/g and is ideally approximately 300 m$^2$/g. According to a second variant, it is more preferably from 350 m$^2$/g to 550 m$^2$/g, most preferably from 450 m$^2$/g to 520 m$^2$/g and is ideally approximately 500 m$^2$/g.

The weight ratio of the second group of particles to the first group of particles advantageously ranges from 5:95 to 60:40, preferably from 10:90 to 50:50, more preferably from 25:75 to 40:60 and is ideally of approximately 32:68. The amount of particles of the second group has primarily an impact on the rheology of the composition.

According to an alternative embodiment, only particles of the first group are present in the composition.

The greater size of the precipitated silica relative to the colloidal silica is advantageous in terms of particle packing of the silica. Precipitated silica is also advantageous because of its high specific surface area, which makes it highly reactive. Besides, since precipitated silica is commercially available in a dry form (i.e. not suspended in water) unlike colloidal silica, the presence of precipitated silica in the composition enables to restrict the quantity of water in the composition. Another advantage of having precipitated silica in the composition in comparison with only colloidal silica is the decrease in the alkali oxide to SiO$_2$ weight ratio in the composition.

The composition may contain a minor amount of alkali silicate. Alkali silicate may "activate" siliceous filler such as finely ground quartz to make it more compatible with the active silica binder by hydrolyzing to silicic acid and attaching the surface of the filler particle, thus conferring it reactive silanol groups. It may also promote adhesion to the substrate on which the composition may be applied as a coating. Alkali silicate may also help destabilize the silicone emulsion, thus allowing for its better incorporation in the composition. Alkali silicate may also be useful as a reactive co-binder. On the other hand, caution must be exercised because an excessive content of alkali silicate may render the final coating water-sensitive.

Advantageously there are more than 100 parts SiO$_2$ per part of alkali oxide (the latter originating mainly from the added silicate) in the composition on a molar basis. However, part of the alkali oxide in the composition may also originate from the presence of colloidal silica and precipitated silica because both materials are prepared starting from silicate and thus usually contain traces of the starting material.

The alkali silicate content added in the composition may be in a partly dissolved form. Potassium silicate, having the formula nSiO$_2$.K$_2$O, (where n is between 3.1 and 3.9) is a preferred choice, although other alkali silicates such as sodium or lithium silicate may also be used, possibly in combination with potassium silicate. The preferred weight ratio of SiO$_2$ to K$_2$O in the potassium silicate is from 1 to 5, preferably from 1.5 to 3, most preferably from 2.0 to 2.5.

The filler particles preferably have a BET specific surface area in the range of 0.1 to 5 m$^2$/g, preferably 0.4 to 2 m$^2$/g, more preferably 0.8 to 1 m$^2$/g; and/or a D50 in the range of 1 to 100 µm, preferably 8 to 50 µm, more preferably 12 to 20 µm.

The filler particles of the present composition are useful for attaining the desired wear-resistance property of the coating made of said composition. Due to the use of both fine particles and filler substances, only very small voids remain between the particles of the filler substance, which are filled by the binder. The composition, once it has been coated onto a concrete article, therefore demonstrates excellent weathering resistance through good adhesion and hydrophobicity (as determined by high water contact angle) upon drying.

The filler may be amorphous or crystalline, preferably crystalline. Suitable fillers are selected from the group including zirconia particles, titania particles, alumina particles, glass powder particles, crystalline silica particles and mixtures thereof.

The composition has a high tensile strength if it contains fiber-form filler particles.

By selecting suitable filler substances, the coefficient of thermal expansion of a coating formed of the composition can be adapted to the coefficient of expansion of the substrate so that no cracking occurs with temperature changes. The filler particles should be chosen according to their resistance to acid, if resistance to attack by acids is of primary importance in the final composition (and in the coating thus obtained).

As examples of crystalline silicate, mica and mixtures of different stratified silicates may be cited. However, a preferred choice of filler is crystalline silica, especially quartz.

The composition may also contain various additives, among which thickeners, dispersing agents and/or defoaming agents.

A thickener, if present, may for example be selected from the group consisting of bentonite, xanthan gum, diutan gum, acrylic (non-associated or associated) and their mixtures.

Bentone EW (by Elementis) is an appropriate choice of bentonite. The composition may for example contain 0.1-0.3 wt % of this additive.

Kelzan RD (by Kelco, Monsanto) is an appropriate choice of xanthan gum. The composition may for example contain 0.1-0.5 wt % of this additive.

Kelcocrete 200 (by Kelco, Monsanto) is an appropriate choice of diutan gum. The composition may for example contain 0.1-0.3 wt % of this additive.

Thixol 53L, Rheo 3000 and Viscoatex 730 (by Omya, Coatex) are appropriate choices of acrylic. The composition may for example contain 0.1-0.3 wt % of one of these additives.

A defoamer, if present, may for example be selected from the group consisting of mineral oil, organic polymer, surfactant and mineral mixtures, polyether siloxane and fume silica mixtures, polydimethylsiloxane and their mixtures.

Rhodoline DF 6600, Rhodoline DF 681 F and Rhoximat DF 6800 (by Rhodia) are appropriate choices of mineral oil. The composition may for example contain 0.1-0.3 wt % of one of these additives.

EFKA 2526 and EFKA 2527 (by Ciba) are appropriate choices of organic polymer. The composition may for example contain 0.1-0.5 wt % of one of these additives.

Dehydran 1922 (by Cognis) is an appropriate choice of surfactant and mineral mixture. The composition may for example contain 0.1-0.3 wt % of this additive.

Tego foamex 855 (by Degussa) is an appropriate choice of polyether siloxane and fume silica mixture. The composition may for example contain 0.1-0.5 wt % of this additive.

AF9020 (by GE Silicones) is an appropriate choice of polydimethyl siloxane. The composition may for example contain 0.1-0.5 wt % of this additive.

A dispersing agent such as a phosphonate terminated polyethylene glycol may also be particularly advantageous in the composition according to the invention (see examples). Such a dispersing agent is known in the art as Optima 100 from Chryso, France. The composition may for example contain 0.1-0.5 wt % of this additive.

A coating of the present invention most often has an aesthetic driver for use on cement-bonded articles. Without limiting the invention, the composition may contain dyes or color pigments. The color pigments may include mineral pigments and/or organic pigments. Examples of mineral pigments include iron oxide, titanium dioxide and colored filler substances such as colored glass powder. Organic pigments such as phtalocyanine, quinacridone or the like can be used, especially if they are introduced in conformance with DE 195 33 081. When mineral pigments are used, they can be regarded as part of the filler particles mentioned above.

The total amorphous silica in the composition, expressed in weight percentage, is advantageously in the range of 10 to 50%, preferably 15 to 40%.

The total of silicone polymer in the composition, expressed in weight percentage, is advantageously in the range of 0.5 to 15%, preferably 1.2 to 8%.

The filler-to-amorphous silica weight ratio is advantageously in the range of 0.8 to 10, preferably 1.4 to 5.

The filler-to-binder weight ratio is advantageously in the range of 1 to 5, preferably 1.4 to 3.5.

The total solids weight content in the composition is advantageously in the range of 50 to 80%, preferably 60 to 75%.

In the above ranges, the mineral pigments, if present, are counted in the filler, and the total of silicone polymer includes not only the vinyl-functional silicone polymer but also the crosslinker, if appropriate.

The above ranges ensure good adhesion (as determined by the dolly pull-off test 7 or 14 days after the application) and high water contact angle.

Advantageously, the composition is sufficiently dilute and stable in the composition to give a shelf life of several weeks, preferably several months.

Making of the Composition

The composition is prepared by mixing together the various components described above in relation with the composition. When the colloidal silica comprises a first group of colloidal silica particles and a second group of colloidal silica particles, each group of particles may be respectively provided by a distinct colloidal silica dispersion. Therefore, a first colloidal silica dispersion and a second colloidal silica dispersion are preferably provided in the mixing process.

For instance the first colloidal silica dispersion may be chosen from the group consisting of the Levasil 100/30% and the Levasil 50/50% grades (by H. C. Starck). For instance the second colloidal silica dispersion may be chosen from the group consisting of the Levasil 300/30% and the Levasil 500/15% grades (by H. C. Starck).

These solutions may be premixed prior to their admixing with the other components.

The order of addition of the main ingredients during mixing is preferably the following:
 a) a first portion of the first and/or second colloidal silica dispersions;
 b) the dispersing agent, when present;
 c) the precipitated silica, when present;
 d) the filler particles;
 e) the remaining portion of the first and/or second colloidal silica dispersions;
 f) the alkali silicate, when present;
 g) optionally, additional water;
 h) the vinyl-functional silicone polymer emulsion; and
 i) the crosslinker and catalyst emulsion.

The first portion of the first and/or second colloidal silica dispersion advantageously comprises from 40 to 80%, preferably from 50 to 70%, more preferably about 60% of the total of colloidal silica dispersions.

The pigment, when used, may be added between steps b) and c).

Application of the Composition onto a Substrate

The composition may be applied onto any kind of substrate by brushing, rolling, pouring, immersing or by any other method known in the art. Yet, spraying is usually the preferred application method. The composition may be used as paint and/or as a protective coating.

The thickness of the coating is usually between 60 µm and 2 mm, preferably between 80 µm and 200 µm, more preferably between 100 µm and 150 µm During the subsequent drying, the composition cures to form a protective coating. Self-crosslinking of the vinyl-functional silicone polymer (optionally via the crosslinker component) and crosslinking of the vinyl-functional silicone polymer together with reactive silica occur in the composition during the drying of the composition (film formation). This physicochemical phenomenon is promoted by the evaporation of water. It may be enhanced by choosing an appropriate curing temperature. The curing temperature may for instance be from 20° C. (ambient temperature) to a 120° C. hot cure. The ambient cure is adequately completed after 24 hours. At 60° C. the coating may be fully cured in 12 hours. At 120° C. the cure can be as little as 1 hour depending on the mass of the article which can influence the time to bring the coating to temperature.

The composition has been shown to be effective for coating cement bonded articles. The cement used to bond the articles may be hydraulic cement. Examples of such cements are Portland cement, blended Portland cement with pozzolanic or non-pozzolanic fillers, calcium aluminate cement, calcium sulfo-aluminate cement, or gypsum cement. Examples of substrates which may advantageously be coated by the composition include cement bonded articles such as concrete and other hard mineral substrates. Further examples would be cement—sand mortars, cement slurries or gypsum plaster surfaces. Concrete articles may be suitably coated by the composition, whether they are troweled, sprayed, precast or cast in place as long as a uniform coating can be applied. The application of the coating onto any mortar or glass fiber reinforced panel or roofing tiles for the outside of homes or buildings is especially advantageous. Exposed cast in place concrete can be coated to provide a more aesthetic, easy to clean, colored or even textured, durable, weather resistant appearance. The composition is also suitable for coating granulates, sand or fillers for decorative purposes for any cement based article surface. By using products of different colors, a marbling effect can be attained in the composition.

Other possible applications of the composition, besides coating, include sealing joints or cracks, bonding building materials and the like. The present composition can for example be used to replace the joint/gap filling composition used when caulking inner pipes of chimneys (pulverized chamotte can then be used as the filler in the composition). In this respect, the high temperature resistance and the good acid resistance of the cured composition is very beneficial.

The coating to the inside of cement based concrete tunnel segments to make the surface resistant to corrosive attack by humidity, condensation and vehicle fumes is a potential application for the present invention.

EXAMPLES

The following examples illustrate the invention without limiting it.

Example 1

Composition MM4

A composition referenced as MM4 was made with the following formulation:

| Component | Dosage (parts) | Dry content (%) |
|---|---|---|
| Quartz filler | 513.7 | 71.55 |
| Colloidal silica (1) | 216.3 | 15.1 |
| K Silicate | 54.1 | 2.18 |
| Polymer emulsion | 108.1 | 6.03 |
| Catalyst emulsion | 21.6 | 1.21 |
| Pigment | 27.0 | 3.77 |
| Dispersing agent | 5.1 | 0.2 |
| Added water | 54.1 | — |
| Total | 1,000 | 100 |

The quartz filler is sold under the trace name Millisil W12 by Quarzwerke. The specified D50 is 16 μm, the specified D95 is 50 μm and the specified BET specific surface area is 0.9 m$^2$/g.

The colloidal silica (1) is sold under the trade name Levasil® 50/50% by H. C. Starck. The particles have a D20 of 76 nm, a D50 of 85 nm, a D90 of 106 nm and a specified BET specific surface area of 50 m$^2$/g.

The potassium silicate is obtained through PQ Europe. The molar ratio is 3.4 and the specified chemical analysis of the component corresponding to Kasil 33 is the following: 24.4 wt % SiO$_2$; 11.9 wt % K$_2$O; 63.7% water.

The polymer emulsion is sold under the trade name Syl-Off® 7900 by Dow Corning. It is a 40% solids emulsion of a vinyl-functional silicone polymer.

The catalyst emulsion is sold under the trade name Syl-Off® 7922 by Dow Corning. It is a 40% solids aqueous emulsion of a reactive organofunctional siloxane and a reactive organo-platinum complex.

The pigment is an iron-oxide based red pigment sold under the trade name Bayferrox® 110.

The dispersing agent is sold by Chryso under the trade name Optima 100.

The total amorphous silica in the composition is 16.6 wt %.

The total silicone in the composition is 7.24 wt %.

The filler-to-amorphous silica ratio (wherein the filler includes the quartz, the pigment and arbitrarily the dispersing agent) is 4.56.

The filler-to-binder ratio (wherein the binder includes the colloidal silica, the precipitated silica when present, the potassium silicate, the polymer and catalyst emulsions) is 3.09.

The total solids content in the composition is 71.8 wt %.

Example 2

Composition MM6

A composition referenced as MM6 was made with the following formulation:

| Component | Dosage (parts) | Dry content (%) |
|---|---|---|
| Quartz filler | 404.3 | 63.04 |
| Colloidal silica (2) | 176.9 | 8.27 |
| Colloidal silica (1) | 210.6 | 16.42 |
| Precipitated silica (1) | 10.5 | 1.64 |
| K Silicate | 33.7 | 1.52 |
| Polymer emulsion | 84.2 | 5.25 |
| Catalyst emulsion | 16.8 | 1.05 |
| Pigment | 16.8 | 2.63 |
| Dispersing agent | 4.0 | 0.18 |
| Added water | 42.1 | — |
| Total | 1,000 | 100 |

Colloidal silica (2) is sold under the trade name Levasil® 300/30% by Bayer. The particles have a D20 of 10 nm, a D50 of 12 nm, a D90 of 17 nm and a specified BET specific surface area of 300 m$^2$/g.

Colloidal silica (1) is the Levasil® 50/50% described above in relation with example 1.

The precipitated silica (1) is sold under the trade name Sipernat® 22 LS by Degussa. The specified BET specific surface area is 175 m$^2$/g and the specified D50 is 8 μm.

All the other ingredients (filler, K Silicate, polymer emulsion, catalyst emulsion, pigment, dispersing agent) are as described above in relation with example 1.

The total amorphous silica in the composition is 27.4 wt %.

The total silicone in the composition is 6.3 wt %.

The filler-to-amorphous silica ratio (wherein the filler includes the quartz, the pigment and arbitrarily the dispersing agent) is 2.41.

The filler-to-binder ratio (wherein the binder includes the colloidal silica, the precipitated silica when present, the potassium silicate, the polymer and catalyst emulsions) is 1.93.

The total solids content in the composition is 64.1 wt %.

Example 3

Composition MM7

A composition referenced as MM7 was made with the following formulation:

| Component | Dosage (parts) | Dry content (%) |
|---|---|---|
| Quartz filler | 394.1 | 60.33 |
| Colloidal silica (2) | 193.6 | 8.89 |
| Colloidal silica (1) | 246.3 | 18.85 |
| Precipitated silica (1) | 10.3 | 1.57 |
| K Silicate | 36.9 | 1.64 |
| Polymer emulsion | 82.1 | 5.03 |
| Catalyst emulsion | 16.4 | 1.01 |
| Pigment | 16.4 | 2.51 |
| Dispersing agent | 3.9 | 0.17 |
| Added water | — | — |
| Total | 1,000 | 100 |

All ingredients are as described above in relation with examples 1 and 2.

The total amorphous silica in the composition is 30.4 wt %.

The total silicone in the composition is 6.04 wt %.

The filler-to-amorphous silica ratio (wherein the filler includes the quartz, the pigment and arbitrarily the dispersing agent) is 2.07.

The filler-to-binder ratio (wherein the binder includes the colloidal silica, the precipitated silica when present, the potassium silicate, the polymer and catalyst emulsions) is 1.7.

The total solids content in the composition is 65.3 wt %.

Example 4

Composition MM11

A composition referenced as MM11 was made with the following formulation:

| Component | Dosage (parts) | Dry content (%) |
|---|---|---|
| Quartz filler | 388.9 | 55.99 |
| Colloidal silica (2) | 202.8 | 8.76 |
| Colloidal silica (1) | 251.9 | 18.13 |
| Precipitated silica (2) | 80.0 | 11.51 |
| K Silicate | 7.6 | 0.32 |
| Polymer emulsion | 40.5 | 2.33 |
| Catalyst emulsion | 8.1 | 0.47 |
| Pigment | 16.2 | 2.33 |
| Dispersing agent | 3.9 | 0.16 |
| Added water | — | — |
| Total | 1,000 | 100 |

Precipitated silica (2) is sold under the trace name Tixosil® 73 by Rhodia. This precipitated silica is hydrated (10 $SiO_2$, $1H_2O$). The specified mean diameter is 6-12 μm.

All the other ingredients are as described above in relation with examples 1 and 2.

The total amorphous silica in the composition is 38.6 wt %.

The total silicone in the composition is 2.80 wt %.

The filler-to-amorphous silica ratio (wherein the filler includes the quartz, the pigment and arbitrarily the dispersing agent) is 1.51.

The filler-to-binder ratio (wherein the binder includes the colloidal silica, the precipitated silica when present, the potassium silicate, the polymer and catalyst emulsions) is 1.41.

The total solids content in the composition is 69.5 wt %.

Example 5

Composition MM16

A composition referenced as MM16 was made with the following formulation:

| Component | Dosage (parts) | Dry content (%) |
|---|---|---|
| Quartz filler | 387.4 | 56.11 |
| Colloidal silica (2) | 188.5 | 8.19 |
| Colloidal silica (1) | 250.9 | 18.17 |
| Precipitated silica (2) | 79.7 | 11.54 |
| K Silicate | 47.9 | 2.01 |
| Polymer emulsion | 21.2 | 1.23 |
| Catalyst emulsion | 4.2 | 0.25 |
| Pigment | 16.1 | 2.34 |
| Dispersing agent | 3.9 | 0.16 |
| Added water | — | — |
| Total | 1,000 | 100 |

All ingredients are as described above in relation with examples 1 to 4.

The total amorphous silica in the composition is 39.3 wt %.

The total silicone in the composition is 1.5 wt %.

The filler-to-amorphous silica ratio (wherein the filler includes the quartz, the pigment and arbitrarily the dispersing agent) is 1.48.

The filler-to-binder ratio (wherein the binder includes the colloidal silica, the precipitated silica when present, the potassium silicate, the polymer and catalyst emulsions) is 1.42.

The total solids content in the composition is 69.0 wt %.

Example 6

Composition MM17

A composition referenced as MM17 was made with the following formulation:

| Component | Dosage (parts) | Dry content (%) |
|---|---|---|
| Quartz filler | 377.4 | 55.51 |
| Colloidal silica (2) | 170.6 | 7.53 |
| Colloidal silica (1) | 244.5 | 17.98 |
| Precipitated silica (2) | 77.6 | 11.41 |
| K Silicate | 86.0 | 3.67 |
| Polymer emulsion | 20.3 | 1.19 |
| Catalyst emulsion | 4.1 | 0.24 |
| Pigment | 15.7 | 2.31 |
| Dispersing agent | 3.8 | 0.16 |
| Added water | — | — |
| Total | 1,000 | 100 |

All ingredients are as described above in relation with examples 1 to 4.

The total amorphous silica in the composition is 39.4 wt %.

The total silicone in the composition is 1.4 wt %.

The filler-to-amorphous silica ratio (wherein the filler includes the quartz, the pigment and arbitrarily the dispersing agent) is 1.47.

The filler-to-binder ratio (wherein the binder includes the colloidal silica, the precipitated silica when present, the potassium silicate, the polymer and catalyst emulsions) is 1.38.

The total solids content in the composition is 68.0 wt %.

Example 7

Composition MM24

A composition referenced as MM24 was made with the following formulation:

| Component | Dosage (parts) | Dry content (%) |
|---|---|---|
| Quartz filler | 372.0 | 56.61 |
| Colloidal silica (1) | 241.0 | 18.33 |
| Colloidal silica (3) | 142.5 | 3.25 |
| Precipitated silica (2) | 76.5 | 11.64 |
| K Silicate | 84.8 | 3.74 |
| Polymer emulsion | 53.4 | 3.25 |
| Catalyst emulsion | 10.7 | 0.65 |
| Pigment | 15.5 | 2.36 |
| Dispersing agent | 3.7 | 0.16 |
| Added water | — | — |
| Total | 1,000 | 100 |

Colloidal silica (3) is sold under the trade name Levasil® 500/15% by Bayer. The particles have a D20 of 4 nm, a D50 of 6 nm, a D90 of 10 nm and a specified BET specific surface area of 500 m$^2$/g.

Colloidal silica (1) is the Levasil® 50/50% as described above in relation with example 1.

All the other ingredients are as described above in relation with the preceding examples.

The total amorphous silica in the composition is 35.8 wt %.
The total silicone in the composition is 3.9 wt %.
The filler-to-amorphous silica ratio (wherein the filler includes the quartz, the pigment and arbitrarily the dispersing agent) is 1.65.
The filler-to-binder ratio (wherein the binder includes the colloidal silica, the precipitated silica when present, the potassium silicate, the polymer and catalyst emulsions) is 1.45.
The total solids content in the composition is 65.7 wt %.

Example 8

Composition MM25

A composition referenced as MM25 was made with the following formulation:

| Component | Dosage (parts) | Dry content (%) |
|---|---|---|
| Quartz filler | 398.3 | 58.2 |
| Colloidal silica (1) | 258.0 | 18.85 |
| Colloidal silica (3) | 152.4 | 3.34 |
| Precipitated silica (2) | 81.9 | 11.97 |
| K Silicate | 7.8 | 0.33 |
| Polymer emulsion | 67.5 | 3.95 |
| Catalyst emulsion | 13.5 | 0.79 |
| Pigment | 16.6 | 2.42 |
| Dispersing agent | 4.0 | 0.16 |
| Added water | — | — |
| Total | 1,000 | 100 |

All ingredients are as described above in relation with the preceding examples.

The total amorphous silica in the composition is 34.4 wt %.
The total silicone in the composition is 4.74 wt %.
The filler-to-amorphous silica ratio (wherein the filler includes the quartz, the pigment and arbitrarily the dispersing agent) is 1.77.
The filler-to-binder ratio (wherein the binder includes the colloidal silica, the precipitated silica when present, the potassium silicate, the polymer and catalyst emulsions) is 1.55.
The total solids content in the composition is 68.4 wt %.

Example 9 (Comparative)

Benchmark Composition

A composition referenced as Benchmark was made with the following formulation:

| Component | Dosage (parts) | Dry content (%) |
|---|---|---|
| Quartz filler | 486.5 | 64.33 |
| Colloidal silica (4) | 438.6 | 29.0 |
| Polymer | 49.0 | 3.24 |
| Pigment | 24.0 | 3.17 |
| Rheology modifier | 2.0 | 0.26 |
| Added water | — | — |
| Total | 1,000 | 100 |

Colloidal silica (4) is a mixture of above-described colloidal silica (1) and colloidal silica (2) with a proportion of 60 wt % of colloidal silica (1) and 40 wt % of colloidal silica (2).

The polymer is a hydroxl-functional PDMS-type polysiloxane sold under the trade name Emulsion 3657 by GE Bayer Silicones.

The rheology modifier is a hectorite clay derivative sold under the trade name Bentone EW by Elementis specialties (Belgium).

The quartz filler and the pigment are as described above in relation with the preceding examples.

The total amorphous silica in the composition is 29 wt %.
The total silicone in the composition is 3.24 wt %.
The filler-to-amorphous silica ratio (wherein the filler includes the quartz, the pigment and arbitrarily the dispersing agent) is 2.33.
The filler-to-binder ratio (wherein the binder includes the colloidal silica, the precipitated silica when present, the potassium silicate, the polymer and catalyst emulsions) is 2.08.
The total solids content in the composition is 75.6 wt %.
The benchmark composition corresponds to the teaching of prior art document CA 2373132.

Example 10

Making of the Compositions

The compositions of examples 1-9 were prepared as follows:
1) Separate weighing of all components with a weighing device having a precision of 0.01 g.
2) Pouring of 60 wt % of the colloidal silica dispersions in a stainless steel vessel.
3) Very mild mixing with a Rayneri turbotest mixer (agitation speed 1-2).

4) Addition of the rheology modifier (for example 9 only); further mild mixing for 10 minutes until the swelling of the composition.
5) Addition of the dispersing agent (for examples 1-8) and then addition of the pigment; further mild mixing until obtaining a homogenous mixture.
6) Slow addition of the precipitated silica (when present) in order to avoid the formation of dust; further mild mixing until obtaining a homogenous mixture.
7) Addition of the quartz filler; increase of the agitation speed to 5-6; further mixing for 2 minutes in order to avoid the formation of agglomerates.
8) Reduction of the agitation speed to 3;
9) Pouring of the remaining 40% of the colloidal solutions; pouring of additional water, if relevant.
10) Addition of the silicate; further mild mixing until obtaining a homogenous mixture.
11) Reduction of the agitation speed to 1-2 in order to avoid the formation of bubbles; pouring of the polymer (for examples 1-8, first the polymer emulsion and then the catalyst emulsion); further mild mixing for 1 minute.
12) Quick pouring of the obtained composition into a container and closing of the container.

Example 11

Hydrophobicity

A contact angle test was performed with compositions MM4, MM6, MM7, MM11, MM16, MM17, MM24, MM25 and Benchmark on a random site using a Digidrop GBX apparatus. A 7 µl water drop was deposited on a smooth cement bonded surface coated with the relevant composition 3-4 weeks after the application of the coating and the substrate/water angle was measured owing to the camera-based acquisition system of the apparatus. More precisely, the contact angle was measured at t=0, t=30 s, t=60 s, t=90 s, t=120 s, t=150 s, with the origin t=0 s being selected so that drop has settled to a steady value. The time needed for the drop to settle is typically a few milliseconds. A similar series of measurements was repeated 5 times at randomly selected sites on the surface.

The smooth cement bonded surface had a ratio of water to binder by weight of 0.27. The ratio of binder to aggregate by weight was 0.84. The maximum diameter of the aggregate was 3.0 mm. The materials used for the smooth cement bonded surface articles were: Type I Cement 52.5 N from Castle Ketton, M20 fly ash from Baumineral, 0.2-3.0 mm concrete sand from Raunheimer, a small quantity of red pigment for a distinguishing color.

The results were as follows (expressed in mean and standard deviation over all measurements):
MM4: 131.2°±2.7°;
MM6: 136.1°±1.9°;
MM7: 134°±2.9°;
MM11: 132.2°±2.2°;
MM16: 106.6°±6.6°;
MM17: 101.1°±2.1°;
MM24: 134.5°±1.8°;
MM25: 133.9°±2.3°; and
Benchmark: 96.5°±4.1°.

They demonstrate the superiority of the compositions according to the invention over the benchmark composition in terms of hydrophobicity.

Example 12

Adhesion

An adhesion pull-off measurement test was performed with compositions MM4, MM6, MM7, MM11, MM16, MM17, MM24, MM25 and Benchmark after coating said compositions on the above-described smooth cement bonded surface.

The protocol was the following: an aluminum dolly of diameter 20 mm was glued to a smooth cement bonded surface coated by the relevant coating composition with DEVCON epoxy glue: an adequate quantity of the epoxy was applied to the lower surface of the aluminum dolly; the aluminum dolly was located on the coated surface by hand; the aluminum dolly was pressed onto the coated surface and rotated 90° by hand to spread the epoxy over the entire surface. 24 hours after gluing, the Zwick press was calibrated and sample was tested in the tensile mode (at an ambient temperature of 20° C.). The testing rate was 10 daN/s. The force at breaking was measured and the result was then converted into a pressure in MPa taking the actual failure pattern into account. The test was repeated 5 times for each type of sample.

The results were as follows (expressed in mean and standard deviation):
MM4: 0.97 MPa±0.09 MPa;
MM6: 1.26 MPa±0.14 MPa;
MM7: 1.99 MPa±0.4 MPa;
MM11: 1.05 MPa±0.25 MPa;
MM16: 1.76 MPa±0.36 MPa;
MM17: 2.89 MPa±0.31 MPa;
MM24: 1.79 MPa±0.26 MPa;
MM25: 1.28 MPa±0.27 MPa; and
Benchmark: 0.92 MPa±0.14 MPa.

They demonstrate that the compositions according to the invention have better adhesive properties than the benchmark composition, in particular composition MM7 and MM17.

Respective adhesion performances of MM7 and the benchmark were then tested on a rough cement bonded surface (unweathered and weathered) and on the above-described smooth cement bonded surface.

The rough cement bonded surface had a ratio of water to binder by weight of 0.41. The ratio of binder to aggregate by weight was 0.22. The maximum diameter of the aggregate was 4 mm. The materials for the rough cement bonded articles were: Type I 52.5 R CE CP2 NF Le Teil, a blend of 0 to 2 mm crushed and washed with 0 to 2 mm river sand from the St. Laurent quarry, G100 Limestone filler from La Gagne, and a little B110 red and B330 black Bayerferrox color for a distinguishing color.

The surface roughness of the rough cement bonded surface was measured by profilometry. Common 3D roughness parameters chosen for an accurate description of the results were as follows: Sa=27.18±6.55; Sq=36.66±7.87; St=243.00±51.95; and Sz=237.21±50.38.

The surface roughness of the smooth cement bonded surface was also measured by profilometry. Common 3D roughness parameters chosen for an accurate description of the results were as follows: Sa=2.126±0.506; Sq=2.714±0.669; St=22.06±4.45; and Sz=21.09±4.54.

Both physical characterizations were obtained by a profilometer (STIL micromeasure 2, STIL SA, France) after scanning 6 areas measuring 5 mm×5 mm chosen randomly on the substrate. Each area was scanned with a 350 µm stylus and the Surface Map 3.0.4 software. The step distance for each pass of the stylus was 5 μm and the frequency setting was 1,000 Hz. The raw data was processed with the Mountains v3.1.10 software.

In all of the following test cases, the rough cement bonded substrate was 4 days old, and the smooth cement bonded surface was 1 day old at the time of the application of the coating. The pull-off for unweathered samples was measured 15 days after coating application. The pull-off for weathered samples was measured after 113 cycles of frost testing carried out according to DIN 52253 part B (i.e. EN 539-2 part B).

The results are as follows (expressed in mean and standard deviation):

MM7 on unweathered rough cement bonded surface: 2.13±0.32 MPa;

Benchmark on unweathered rough cement bonded surface: 2.09±0.35 MPa;

MM7 on weathered rough cement bonded surface: 1.92±0.43 MPa;

Benchmark on weathered rough cement bonded surface: 1.14±0.34 MPa;

MM7 on unweathered smooth cement bonded surface: 1.99±0.4 MPa; and

Benchmark on unweathered smooth cement bonded surface: 0.92±0.14 MPa.

What is claimed is:

1. A composition comprising a binder, filler particles and water,
wherein the binder comprises amorphous silica and a vinyl-functional silicone polymer, wherein the amorphous silica comprises a combination of colloidal silica particles and precipitated silica, the colloidal silica particles comprising a first group of particles having a size of more than 20 nm and a second group of particles having a size of less than 20 nm, as determined by laser particle size analysis, and wherein the second group contains 10 to 50 wt % of all colloidal silica particles;
and wherein the filler particles have a BET specific surface area in the range of 0.1 to 5 $m^2/g$ and/or a D50 in the range of 1 to 100 μm.

2. The composition of claim 1, wherein the binder additionally comprises a crosslinker and a catalyst.

3. The composition of claim 2, wherein the binder additionally comprises one or more alkali silicates.

4. The composition of claim 3, wherein the alkali silicate is potassium silicate.

5. The composition of claim 2, wherein the cross linker is a reactive organofunctional siloxane or polysiloxane.

6. The composition of claim 2, wherein the catalyst is an organoplatinum complex.

7. The composition of claim 1, wherein:
the colloidal silica particles of the first group have a D50 in the range of 30 to 200 nm and the colloidal silica particles of the second group have a D50 in the range of 3 to 20 nm; and the colloidal silica particles of the first group have a BET specific surface area in the range of 30 to 100 $m^2/g$ and the colloidal silica particles of the second group have a BET specific surface area in the range of 200 to 600 $m^2/g$.

8. The composition of claim 1, wherein the precipitated silica is in the form of precipitated silica particles having:
a BET specific surface area in the range of 75 to 500 $m^2/g$; and a D50 in the range of 1 to 50 μm.

9. The composition of claim 1, wherein the filler particles are selected from the group consisting of glass powder particles, zirconia particles, titania particles, alumina particles, crystalline silica particles and mixtures thereof.

10. The composition of claim 1 comprising one or more additives selected from the group consisting of thickeners, dispersing agents, defoaming agents, and mixtures thereof.

11. The composition of claim 1, wherein:
the filler particles-to-amorphous silica weight ratio is in the range of 0.8 to 10; and
the silicone polymer weight content, expressed relative to the weight of the composition, is in the range of 0.5 to 15%; and
the amorphous silica weight content, expressed relative to the weight of the composition, is in the range of 10 to 50%.

12. The composition of claim 1, wherein the filler particles have a BET specific surface area in the range of 0.4 to 2 $m^2/g$.

13. The composition of claim 1, wherein the filler particles have a BET specific surface area in the range of 0.8 to 1 $m^2/g$.

14. The composition of claim 1, wherein the filler particles have a D50 in the range of 8 to 50 μm.

15. The composition of claim 1, wherein the filler particles have a D50 in the range of 12 to 20 μm.

16. A cement bonded article comprising the composition of claim 1 and a substrate therefor.

17. The cement bonded article of claim 16, which is a roofing tile.

* * * * *